United States Patent
Yamamoto et al.

(10) Patent No.: US 6,794,832 B2
(45) Date of Patent: Sep. 21, 2004

(54) LIGHTING METHOD AND APPARATUS FOR HIGH-PRESSURE DISCHARGE LAMP, AND HIGH-PRESSURE DISCHARGE LAMP APPARATUS

(75) Inventors: Masahiro Yamamoto, Takatsuki (JP); Shunsuke Ono, Takatsuki (JP); Minoru Ozasa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/392,576

(22) Filed: Mar. 20, 2003

(65) Prior Publication Data

US 2003/0201735 A1 Oct. 30, 2003

(30) Foreign Application Priority Data

Mar. 29, 2002 (JP) .................................. 2002-096613

(51) Int. Cl.[7] ................................................ G05F 1/00
(52) U.S. Cl. .................... 315/307; 315/360; 315/291; 315/362; 315/289; 315/DIG. 7
(58) Field of Search .......................... 315/307, 291, 315/224, 209 R, 289, 360, 362, DIG. 5, DIG. 7

(56) References Cited

U.S. PATENT DOCUMENTS 6,127,788 A  * 10/2000  Yamamoto et al. ......... 315/307
6,294,870 B1 *  9/2001  Kawashima et al. ....... 313/623

FOREIGN PATENT DOCUMENTS

| JP | 63-309827 | | 12/1988 |
| JP | 05-067496 | * | 3/1993 |
| JP | 05-144577 | * | 6/1993 |
| JP | 07-065983 | | 3/1995 |
| JP | 07-282986 | | 10/1995 |
| JP | 2002-324689 | | 11/2002 |

* cited by examiner

*Primary Examiner*—Haissa Philogene

(57) ABSTRACT

Disclosed are a lighting method for a high-pressure discharge lamp, a lighting apparatus for a high-pressure discharge lamp, and a high-pressure discharge lamp apparatus each suppresses abnormal blackening of a discharge tube that may occur at an initial stage of operation from a discharge start. According to the lighting method of the present invention, the lamp current is reduced upon detection, by an abnormal discharge detector 5021, of an abnormal discharge that is produced between a tip of one electrode and a root of the other electrode.

26 Claims, 7 Drawing Sheets

FIG.7

| POWER SETTING UPON ABNORMAL DISCHARGE (W) | TIME LAPSED BEFORE ABNORMAL DISCHARGE (MS) | | DURATION OF ABNORMAL DISCHARGE (MS) | | LAMP VOLTAGE (V) UPON ABNORMAL DISCHARGE | |
| --- | --- | --- | --- | --- | --- | --- |
| | MEASUREMENT | AVERAGE | MEASUREMENT | AVERAGE | MEASUREMENT | AVERAGE |
| 150 | 2,180~2,660 | 2,420 | 55~90 | 69 | 185~210 | 198 |
| 100 | 2,200~2,625 | 2,412 | 195~425 | 303 | 185~210 | 198 |
| 50 | 2,150~2,630 | 2,419 | 255~1,365 | 847 | 180~220 | 201 |

LIGHTING METHOD AND APPARATUS FOR HIGH-PRESSURE DISCHARGE LAMP, AND HIGH-PRESSURE DISCHARGE LAMP APPARATUS

This application is based on an application No. 2002-96613 filed in Japan, the content of which is hereby incorporated by reference.

BACKGROUND OF THE INVENTION

(1) Field of the Invention

The present invention relates to a lighting method and apparatus for a high-pressure discharge lamp, and also to a high-pressure discharge lamp apparatus.

(2) Description of Related Art

In recent years, there have been active developments in projection display apparatuses such as liquid crystal projectors. A preferable light source for a projection display apparatus is a high-intensity light source that comes close to a point-source. For this reason, projection display apparatuses generally employ a high-pressure short-arc discharge lamp, such as a so-called high-pressure mercury lamp. A lighting circuit employed for operating such a high-pressure discharge lamp is, for example, an electronic ballast in full bridge configuration (supplying square wave voltage).

To meet the recent need for high-pressure discharge lamps that are comparable to a point-source, developments are underway for high-pressure discharge lamps having a shorter arc length. For example, in the case of a high-pressure mercury lamp with the nominal power of 150W, the electrode distance is shortened to 1.5 mm or less from the conventional electrode distance of 1.5–2.0 mm. Unfortunately, however, inventors of the present invention have noticed problems associated with such a lamp having the nominal power of 150W and the electrode distance of 1.5 mm or shorter. For example, in life tests conducted by the inventors of the present invention, some of such lamps exhibited abnormal blackening of the discharge tube within as short as 500 hours of aging.

SUMMARY OF THE INVENTION

An object of the present invention is to provide a lighting method for a high-pressure discharge lamp, a lighting circuit for a high-pressure discharge lamp, and a high-pressure discharge lamp apparatus all of which are free from such abnormal blackening of the discharge tube as described above.

The object stated above is achieved by a lighting method according to the present invention for a high-pressure discharge lamp. The high-pressure discharge lamp is composed of a discharge tube that is filled with mercury, a rare gas and a halogen material, and that has a pair of electrodes provided therein. The lighting method includes: a discharge shift detecting step of detecting that a discharge across the pair of electrodes has shifted to an arc discharge after a discharge starts and before the mercury fully evaporates; a voltage rise detecting step of detecting that a lamp voltage has risen to exceed a predetermined level after a shift to an arc discharge is detected and before the mercury fully evaporates; and a current reducing step of reducing a lamp current when the lamp voltage is detected in the voltage rise detecting step to exceed the predetermined level.

According to the lighting method of the present invention for a high-pressure discharge lamp, the lamp current is reduced when an abnormal discharge is detected. With this arrangement, the impact on the electrode roots is reduced, and thus there is an effect of suppressing blackening of the discharge tube that would otherwise caused by the abnormal discharge.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 7 is a table showing measurements on high-pressure mercury lamps each having a nominal power of 150W during an abnormal discharge, namely the time elapsed between discharge start and occurrence of an abnormal discharge, the duration of the abnormal discharge, and the lamp voltage at the time of the abnormal discharge.

DESCRIPTION OF THE PREFERRED EMBODIMENT

Figure 1:
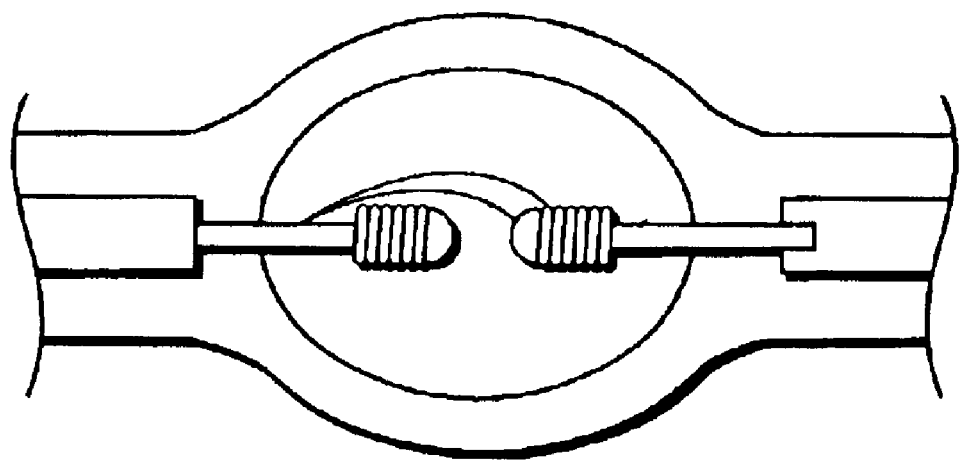
FIG. 1 is a schematic view illustrating the state of abnormal discharge.

Prior to concrete embodiments of the present invention, description is given to developments made by the inventors to arrive at the present invention. First, to clarify the cause of discharge tube blackening described above, the inventors of the present invention have visually inspected the state of discharge at an initial stage of lamp operation. As a result of the inspection, it has been noted that unlike an ideal discharge that occurs between tips of a pair of electrodes, the discharge occurs between a tip of one electrode and a root of the other electrode as shown in FIG. 1.

During such a discharge (hereinafter, referred to as an "abnormal discharge"), dissociated ions attack the electrode roots so that the electrode material of tungsten spatters from the electrode roots. This phenomenon is concluded to be the cause of an abnormal blackening of the discharge tube that occurs from an initial stage of the lamp operation. The inventors of the present invention have studied the lamp voltage during the abnormal discharge and made the following findings. That is, during a normal discharge, a glow discharge occurs first at the initial stage, and the lamp voltage drops when shifting to an arc discharge phase. However, the lamp voltage measured during the abnormal discharge is much higher than the lamp voltage belonging to an arc discharge phase.

In addition, through studying the duration of such abnormal discharge, the following assumption has been made on the cause of the abnormal discharge. That is, since abrupt evaporation occurs immediately after starting the lamp operation, the mercury vapor exists without being uniformly spread so as to cover the electrode tips or to be deposited on the electrode tips. As such, the discharge between electrode tips is less likely to be maintained, which eventually causes electrons to be emitted from the root of the cathode since it is not covered by the mercury vapor. Such a phenomenon occurs not only when the starting lamp current is a direct current or a low frequency alternating current, but also when the starting lamp current is a high frequency alternating current.

The inventors have arrived at the present invention through the assumptions: (1) abnormal blackening of the discharge tube is caused by dissociated ions attacking the electrode roots that occurs at the time of an abnormal discharge, (2) occurrence of abnormal discharge is detectable by monitoring the lamp voltage, and (3) an abnormal discharge is caused by mercury covering the electrode tips. The present invention is based on a technical idea to reduce the lamp current when detecting a rise in the lamp voltage (occurrence of an abnormal discharge) during a predetermined time period. The predetermined time period is determined based on a transition period that takes place after the discharge starts and until the mercury fully evaporates. It should be appreciated that the present invention is distinct from an overvoltage protection/shutdown function for preventing excessive damage of lamp electrodes, breakage of a lamp, or malfunction of a lighting circuit.

In aspect of the present invention, a first lighting method for a high-pressure discharge lamp is used for lighting a high-pressure discharge lamp having a discharge tube that is provided with a pair of electrodes therein, and that is filled with mercury, a rare gas and halogen. According to the first lighting method, the lamp current is reduced when it is detected, during a predetermined time period in a transition state, that the lamp voltage has exceeded a predetermined level after the discharge across the pair of electrodes shifts to an arc discharge phase. The transition state begins upon a discharge start and continues until the mercury fully evaporates.

It should be noted that the term "reduction" of the lamp current used herein covers the concept of reducing the lamp current to zero, i.e., "cutoff" of the lamp current. Yet, in the description of preferred embodiments below, reduction of the lamp current to zero may be referred to as "cutoff", while reduction of the lamp current not to zero may be referred to as "reduction" for the sake of convenience. Further, the lamp current reduction control may be performed immediately after detecting that the lamp voltage has risen to exceed the predetermined level. Alternatively, the lamp current reduction control may be performed when the lamp voltage rises and remains high for a while so as to avoid uselessly performing the lamp current control in response to a noise. It is not necessary to specifically limit how long the lamp voltage should remain high before performing the lamp current reduction control.

Here, a specific length of time taken until the mercury fully evaporates may differ for each lamp depending on the specifications, for example. Thus, it appears to be desirable to empirically determine the duration of the time period in view of the state of abnormal discharge, for example. Generally speaking, however, the duration of five seconds or so from a most-recently produced dielectric breakdown between the pair of electrodes may be sufficiently practical. Here, the dielectric breakdown is specifically described as the "most-recently" produced one because dielectric breakdown may be produced more than one time in the case, for example, where a discharge fades out. Further, the duration the predetermined time period may be "five seconds". This is because it usually takes five seconds or so for the mercury adhered to the electrode tips to fully evaporate in response to the temperature rise in the discharge tube, whereby the possibility of an abnormal discharge is reduced.

Further, the "predetermined level" of the lamp voltage is determined in view of the above finding that the lamp voltage at the time of an abnormal discharge is higher than the voltage belonging to a normal arc discharge phase. Thus, the "predetermined level" may be determined so as to fall between the lamp voltage at the time of an arc discharge and the lamp voltage at the time of an abnormal discharge. In one specific example, the predetermined level may be determined to be equal to the nominal lamp voltage or 50% of the nominal lamp voltage. Alternatively, the predetermined level may be determined empirically.

Further, the following points are noted. An abnormal discharge may occur before the discharge across the electrodes shifts to an arc discharge phase and thus immediately after a start of the lamp operation. In addition, there is a fixed upper limit, applicable to most lamps, to the duration of a glow discharge that first occurs across the electrodes, i.e., to the time elapsed before a glow discharge shifts to an arc discharge. In view of the above, the inventors of the present invention have found that a second lighting method of the present invention for a high-pressure discharge lamp is also effective.

In another aspect of the present invention, the second lighting method for a high-pressure discharge lamp is used for lighting a high-pressure discharge lamp having a discharge lamp that is provided with a pair of electrodes and that is filled with mercury, a rare gas, and halogen. According to the second lighting method, the lamp current is reduced when it is detected, during a first predetermined time period in a transition state, that the lamp voltage has exceeded a predetermined level after a lapse of a second predetermined time period. The transition state begins upon a discharge start and continues until the mercury fully evaporates. The second predetermined time period is determined to fall within the first predetermined time period. The predetermined level is higher than the lamp voltage belonging to a normal arc discharge phase. The "reduction" of the lamp current used herein also covers "cutoff" of the lamp current. In addition, the "first predetermined time period" may be understood to be "a predetermined time period in the transition state that begins upon a discharge start and continues until the mercury fully evaporates".

Here, the duration of the "second predetermined time period" is determined based on the duration of a normal glow discharge that initially occurs across the electrodes (hereinafter, such a glow discharge is referred to as "initial glow discharge"). For example, in the case of such a lamp that the initial glow discharge continues for 2 ms at the longest, the duration of the second predetermined time period is determined to be 2 ms. Yet, it is likely that an optimum duration of the second predetermined time period differs for each lamp depending on the specifications, for example. Thus, it is preferable to empirically determine the duration of the second period.

Note that in the case where the lamp current is once "cut off", it is preferable to re-start the lamp operation again. More preferably, the lamp operation is re-started before too long a time has elapsed. Through various studies, the inventors of the present invention have found that the lamp operation is preferably re-started within 2 seconds. This is because dissociated ions and electrons having been generated before the lamp current cutoff decrease with a lapse of two seconds. Having lost much of the dissociated ions and electrons, the lamp operation can not be readily re-started. Accordingly, the time allowed to be elapsed before re-starting the lamp operation may not always be "two seconds", and may differ for each lamp depending on the specifications, for example.

In yet another aspect of the present invention, a high-pressure discharge lamp apparatus is composed of a lighting apparatus of the present invention. Here, specific examples of such a high-pressure discharge lamp apparatus include various types of liquid crystal projector employing a high-pressure discharge lamp as the light source, a general-purpose illumination apparatus, a headlight for a vehicle, an illumination apparatus for a medical use, and a curing apparatus for a UV curable resin. In addition, a high-pressure discharge lamp apparatus of the present invention may be put into the market either with or without a high-pressure discharge lamp originally attached to the apparatus. In the former case, the high-pressure discharge lamp apparatus may be provided with a socket for the attachment of the lamp, or without a socket so that the lamp is directly connected to a lighting circuit of the apparatus.

Note that an abnormal discharge occurs more notably in a lamp having the arc length of 1.5 mm or shorter. This is because the distance between a tip of one electrode and a root of the other electrode is relatively shorter, and thus a discharge between them more readily occurs. It is naturally understood, however, the present invention is applicable not only to a lamp having an arc length of 1.5 mm or shorter, but also to a lamp having a conventional arc length. A lamp having a conventional arc length is not totally free from the possibility of an abnormal discharge.

PREFERRED EMBODIMENTS

Figure 2:
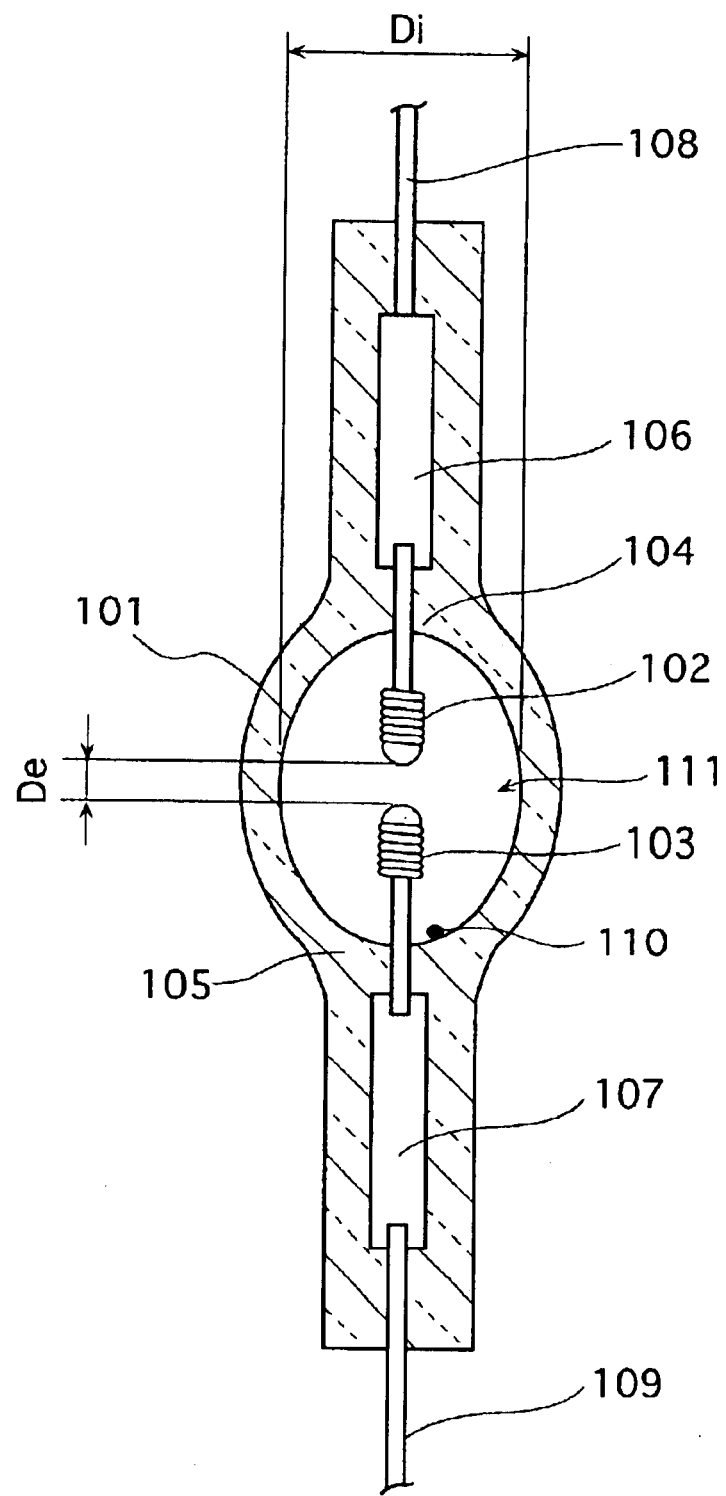
FIG. 2 is a view showing the construction of a high-pressure mercury lamp 100 of an embodiment consistent with the present invention.

Hereinafter, description is given to the present invention by way of a preferred embodiment mainly of a lighting method for a high-pressure discharge lamp with reference to the accompanying drawings. First, description is given to the construction of a high-pressure mercury lamp as one example of a high-pressure discharge lamp. FIG. 2 is a view showing the construction of a high-pressure mercury lamp 100 employed in the present embodiment. As shown in the figure, the high-pressure mercury lamp 100 is composed of a discharge tube 101 enclosing a discharge space 111 therein. Two electrodes 102 and 103 inwardly extend from sealing portions 104 and 105, respectively, of the discharge tube 101 so as to oppose to each other in the discharge space 111 with a predetermined electrode distance (De) therebetween. Each of the electrodes 102 and 103 is formed of a tungsten-made electrode rod having a tungsten coil mounted around a discharging end thereof. The tip portion has been heated to melt the coil into a dome shape. In the present embodiment, the electrode rod is 0.4 mm in diameter and 7.0 mm in length (before the tip portion forming), and the tungsten coil is made from six turns in double-layer (before the tip portion forming) of a 0.275 mm diameter wire.

The discharge tube 101 is composed of a quartz-made envelope and has a substantially spheroidal shape. The tungsten electrodes 102 and 103 are fixedly attached to the sealing portions 104 and 105, respectively, in a manner to hermetically seal the discharge space 111 and to be connected to first ends of molybdenum foils 106 and 107 embedded therein. The second ends of the molybdenum foils 106 and 107 are connected to external molybdenum lead wires 108 and 109, respectively. The discharge tube 101 is 4.4 mm in inside diameter (Di), and 0.06 $cm^3$ in inner volume. The electrode distance (De), i.e., the distance between the tungsten electrodes 102 and 103 is 1.1 mm.

The discharge space 111 is filled with mercury 110 acting as a luminescent material, and a rare gas, such as argon, acting as a starting aid, along a halogen element of bromine. In the present embodiment, the amount of mercury 110 is 13.8 mg (that is approximately equivalent to the mercury vapor pressure of 23 Mpa under a steady lamp operation). The pressure of argon is 20 kPa under a cooled lamp condition, and the amount of bromine is $1.0 \times 10^{-6}$ $mol/cm^3$.

Figure 3:
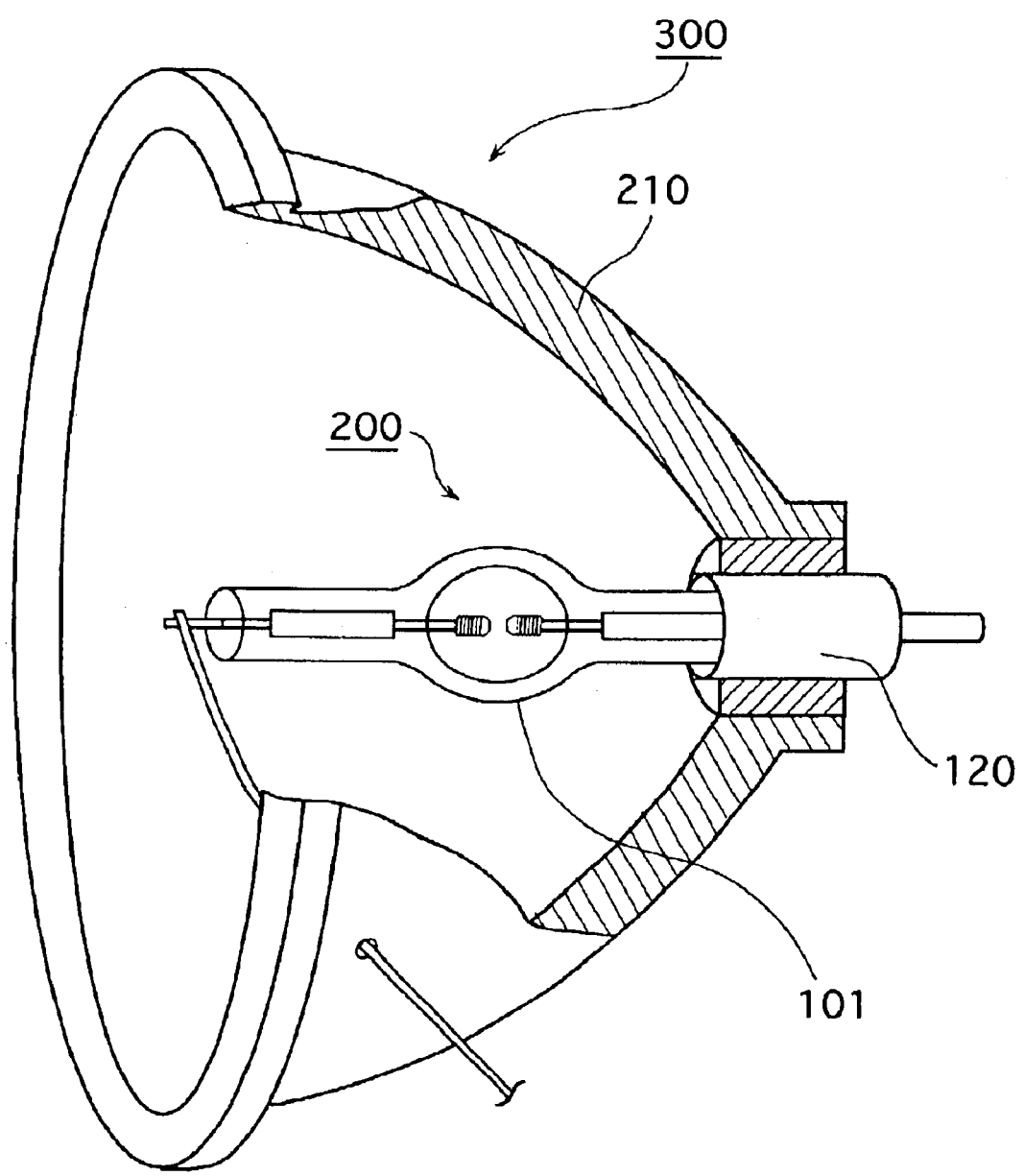
FIG. 3 is a partly-broken view showing the construction of a lamp unit.

Referring now to FIG. 3, a finished lamp 200 is composed of the discharge tube 101 provided with a cap 120 attached to one end thereof. A reflecting mirror 210 attached to the finished lamp 200 to constitute a lamp unit 300.

Next, description is given in detail to a lighting method, a lighting apparatus, and other techniques all according to the present invention for operating a high-pressure discharge lamp (hereinafter, the former is simply referred to as a "lighting method", and the latter as a "lighting apparatus").

(1) Construction of Lighting Apparatus

Figure 4:
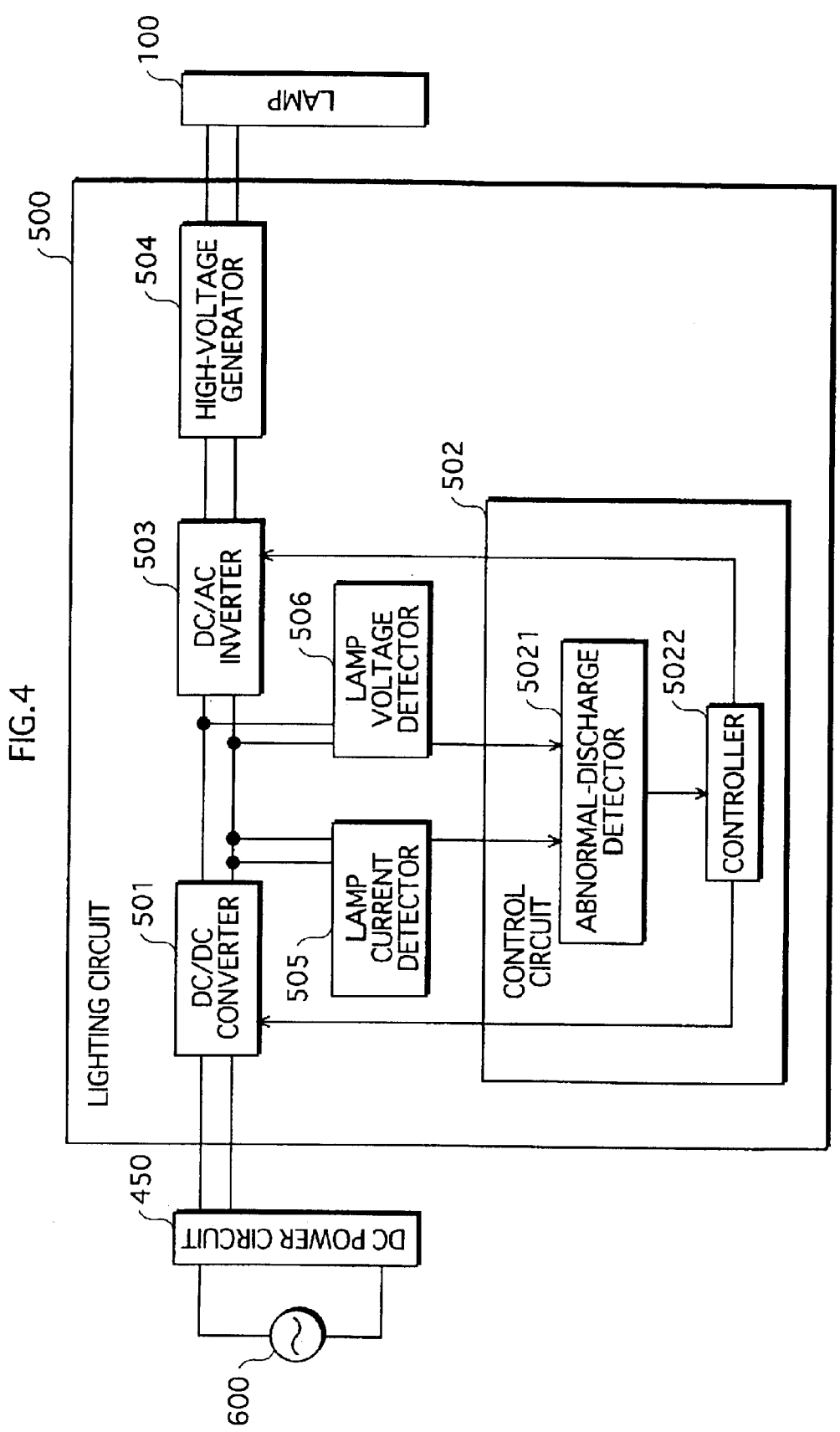
FIG. 4 is a view showing an exemplary construction of a lighting apparatus of an embodiment consistent with the present invention.

FIG. 4 is a block diagram showing the construction of a lighting apparatus according to the present embodiment. As shown in the figure, a lighting apparatus 400 of the present embodiment includes a DC power circuit 450 and a lighting circuit 500, and operates the lamp 100, for example, with a domestic 100V AC power supply 600.

The DC power circuit 450 may include a rectifier circuit to generate a DC voltage from the AC power supply 600. Under control exerted by a control circuit 502 composed of a microcomputer, a DC/DC converter 501 supplies a predetermined level of DC current to a DC/AC inverter 503. The DC/AC inverter 503 generates, also under control by the control circuit 502, a square wave voltage at a predetermined frequency to supply to the lamp 100. A high-voltage generator 504 used to start the lamp 100 includes, for example, a power transformer, and supplies a high voltage generated therein to the lamp 100 in order to cause dielectric breakdown between the electrodes and thus to start discharge.

In the present embodiment, upon occurrence of an initial discharge, i.e., a glow discharge between the electrodes of the lamp 100, a lamp voltage detector 506 issues to the control circuit 502 a detection signal indicative of the discharge start. The control circuit 502 includes an abnormal-discharge detector 5021. The abnormal-discharge detector 5021 performs its function by a program run on the control circuit 502 (microcomputer). The processing performed by the control circuit 502 is described later.

Under the steady state operation, both detection signals issued by the lamp current detector 505 and the lamp voltage detector 506 are sent to the controller 5022. In response to the detection signals, the controller 5022 issues a signal to the DC/DC converter 501, thereby controlling the lamp power. The control performed herein is a constant power control. To be more specific, the controller 5022 compares the product of a current detected by the lamp current detector 505 and a voltage detected by the lamp voltage detector 506 with a reference power stored in an internal memory (not illustrated) provided in the control circuit 502. Based on the comparison, the controller 5022 controls the output current (duty ratio) of the DC/DC converter 501 so as to keep the lamp power constant.

(2) Processing by Lighting Apparatus

Figure 5:
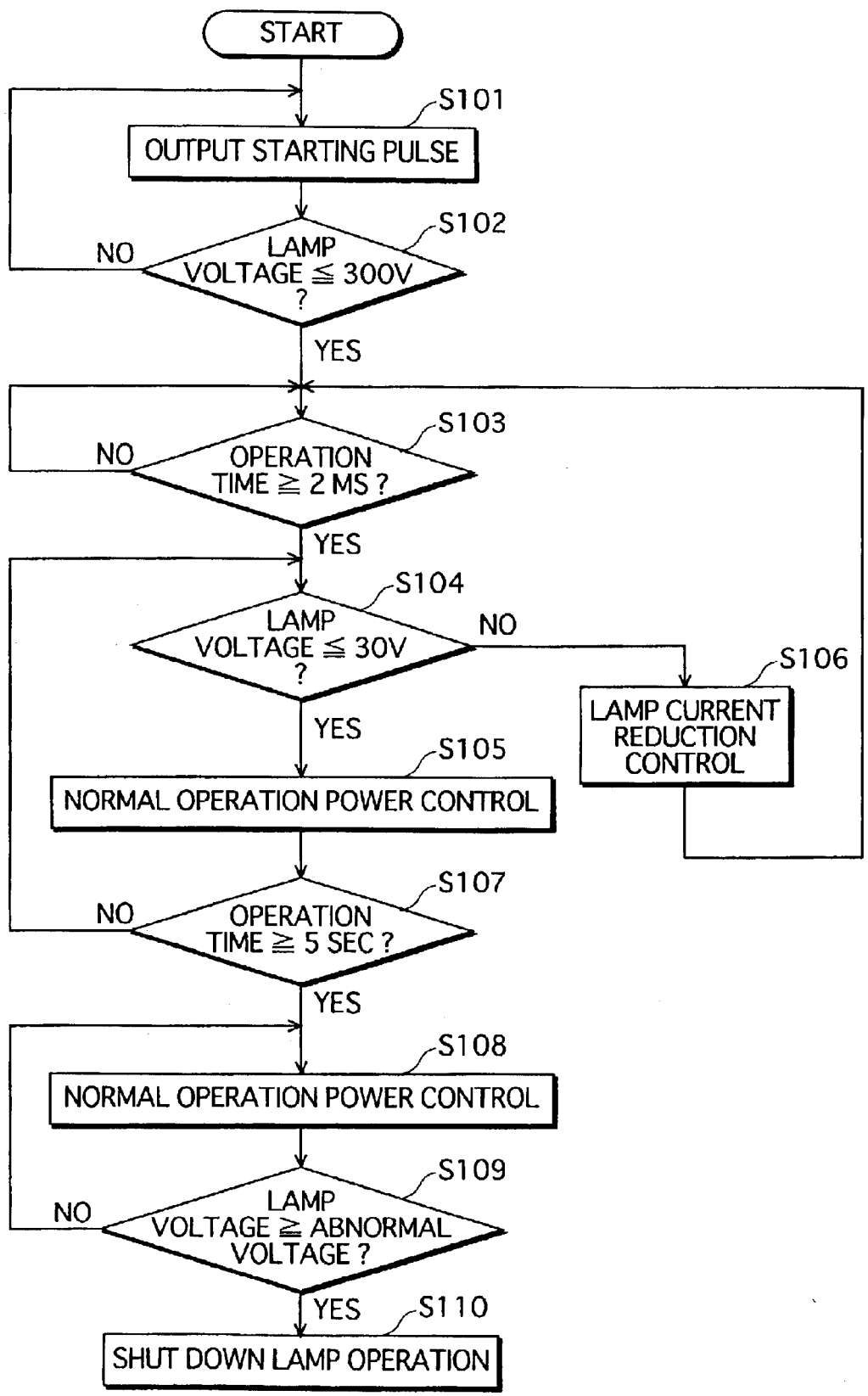
FIG. 5 is a flowchart showing exemplary processing of a program run on a microcomputer acting as a control circuit 502.

Next, description is given in detail to processing steps of the program run on the microcomputer acting as the control circuit 502. FIG. 5 is a flowchart showing one example of the processing steps of the program.

The processing shown in the figure starts when the power supply is turned ON. While a predetermined voltage is applied across the electrodes of the lamp 100, the control circuit 502 outputs staring pulses (S101). The control circuit 502 then judges whether the lamp voltage is 300V or below (S102) in order to detect the start of lamp operation, i.e., the establishment of an initial glow discharge across the electrodes. When the lamp voltage does not drop to 300V or below (S102: No), it is judged that a discharge is failed to be caused despite the starting pulses outputted. In such a case, the control circuit 502 again outputs starting pulses (S101).

On the other hand, when the lamp voltage is below 300V (S102: Yes), the control circuit 502 further judges whether the lamp voltage has dropped to 30V or below (S104) in order to detect that the discharge has shifted to an arc discharge phase. Note that there must be a lapse of 2 ms between the steps S104 and S102, i.e., after the glow discharge has started (S103). This is because the lamp 100 of the present embodiment undergoes an initial glow discharge for the duration of 2 ms at the longest.

When judging, after a lapse of 2 ms, that the lamp voltage is 30V or below (S104: Yes), the control circuit 502 judges that the discharge has been successfully shifted to the arc discharge phase, and thus performs the power control for a normal lamp operation (S105). However, when the lamp voltage exceeds 30V (S104: No) even after a lapse of 2 ms, it is judged that an abnormal discharge takes place instead of a shift of the discharge from the initial glow discharge phase to the arc discharge phase.

Consequently, the control circuit 502 reduces the lamp current (S106). In the present embodiment, the lighting apparatus performs the constant power control, so that the lamp current is reduced by varying the reference power used for the constant power control to a smaller value. The lamp current reduction control is continuously performed until it is judged in the step S104 that the lamp voltage drops to 30V or below, i.e., the discharge shifts to a normal arc discharge. Alternatively, however, it is applicable to perform the lamp current reduction control only for a predetermined time period.

When the lamp voltage finally drops to 30V or below (S104: Yes), the control circuit 502 performs the power control for a normal lamp operation (S105). Thereafter, the control circuit 502 judges whether the lamp has been operated for at least 5 seconds (S107). When the operation period is less than 5 seconds (S107: No), the processing returns to the step S104. In the cases where the lamp voltage exceeds 30V at this time (S104: No), it is judged that an abnormal discharge takes place after the discharge once shifted to the arc discharge stage. Thus, the control circuit 502 performs the lamp current reduction control (S106).

After 5 seconds of lamp operation, it is assumed that an abnormal discharge will no longer occur. Thus, the control circuit 502 performs the power control for a normal lamp operation (S108), and shuts down the lamp (S110) in the case of detecting the lamp voltage reaching a level predetermined as an abnormal voltage (a threshold for detecting abnormal conditions such as damage on an electrode) (S109: Yes). This is to fulfill a so-called overvoltage protection/shutdown function that is generally furnished to a conventional lighting circuit in order to prevent excessive damage of the lamp electrodes, breakage of the lamp, or malfunction of the lighting circuit. In this case, the lamp will not be started again unless externally manipulated.

Figure 6:
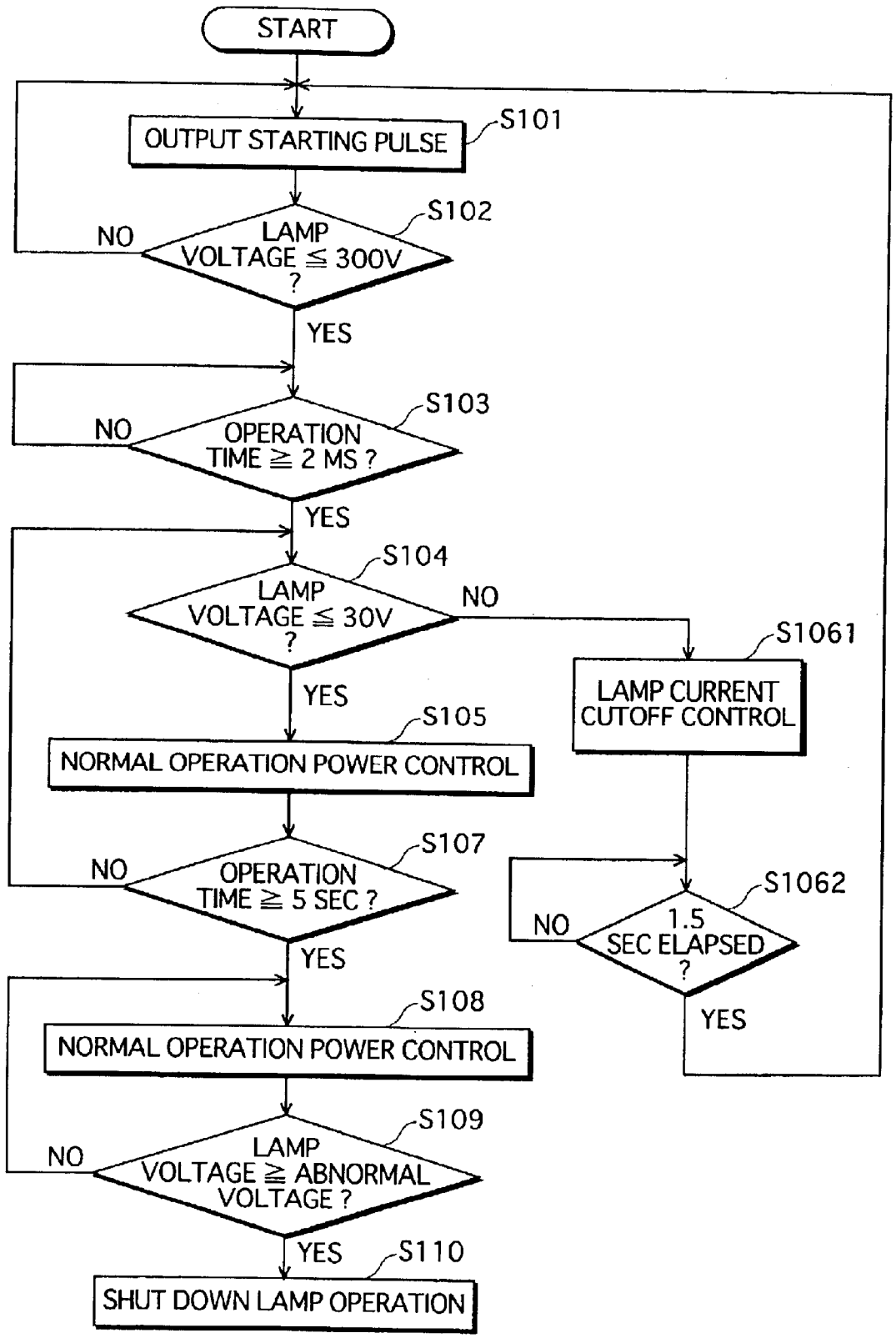
FIG. 6 is a flowchart showing exemplary processing of a program run on a microcomputer for a lamp current cutoff control.

In the above example, when an abnormal discharge occurs, the lamp current reduction control is performed. Alternatively, it is applicable to perform a lamp current cutoff control to cut off a supply of the lamp current upon occurrence of an abnormal discharge. FIG. 6 is a flowchart showing one example of the processing steps of a program run on the microcomputer to perform the lamp current cutoff control. Among steps shown in the figure, description to the steps similar to the lamp current reduction control is omitted.

In the lamp current cutoff control, when the lamp voltage exceeds 30V (S104: No), the control circuit 502 stops supplying the lamp current (S1061) thereby to temporary halt the discharge. In the example shown in FIG. 6, a next step is to judge whether 1.5 seconds has been elapsed after the halt (S1062). After a lapse of 1.5 seconds, the processing returns to the step S101 to re-start the lamp operation.

Although the lamp operation is re-started after the lapse of 1.5 seconds in the above example, it is not necessary to limit the time period to 1.5 seconds. Yet, it should be noted that once discharge occurs, there are generated certain amount of dissociated ions and electrons in the discharge space, so that a discharge is readily caused. In the case where an excessively long period is elapsed before re-stating the lamp operation, the already present dissociated ions and electrons are lost, and thus the discharge space is back into the state where discharge starts hard. In view of the above, in the present embodiment, the lamp operation is re-started after a lapse of 1.5 seconds. The inventors of the present invention have confirmed, through the studies conducted, that a preferable lapse of time is 2 seconds or shorter. Yet, it is likely that an optimum time to be elapsed differs depending on the specifications (the nominal power, for example) of the lamp.

Next, description is given to the reasons for the above setting of the lamp voltage and the time period to be elapsed with reference to measurement data. FIG. 7 is a table showing measurements made on high-pressure mercury lamps during an abnormal discharge. Each lamp measured had the nominal power of 150W (10 samples for each of three different reference power settings to be effected at the time of abnormal discharge) To be more specific, the table shows the time elapsed between a discharge start and occurrence of an abnormal discharge, the duration of abnormal discharge, and the lamp voltage at the time of the abnormal discharge. The measurements were made not under the lamp current cutoff control but the lamp current reduction control that was preformed by varying the reference power setting for an abnormal discharge.

The duration of abnormal discharge differed depending on the reference power setting for an abnormal discharge. The lamp voltage measured upon an abnormal discharge on each lamp was all substantially uniform irrespective of the different reference power setting for an abnormal discharge. The smaller the set reference power was, the greater the lamp current reduction was. Here, it is assumed that what matters for the discharge to shift from an abnormal state to a normal state is the degree of evaporation of mercury that adheres to the tip of each electrode. The mercury evaporates as the temperature in the discharge tube rises, and the temperature rise is determined depending on the total power supplied to the discharge tube. Accordingly, when the reference power setting for an abnormal discharge is smaller, the abnormal discharge lasts longer. Yet, due to the reduced lamp current, the impact of the attack on the root of each electrode by dissociated ions is smaller, so that abnormal blackening of the discharge tube is suppressed.

As shown in FIG. 7, it has been found that the time elapsed between the discharge start and the end of abnormal discharge never exceeded approximately 5 seconds. Based on the above finding, the step S107 is performed so as to allow the control according to the present invention to be performed any time as necessary until after a lapse of 5 seconds. In addition, although varied within the range of 180–220V, it is said that the lamp voltage at the time of abnormal discharge was approximately 200V. Accordingly, the reference voltage used in the step S104 is satisfactory determined to be less that approximately 170V. Yet, for the sake of convenience, the reference voltage in the present embodiment is determined to be 30V, which exceeds approximately 50% of the nominal lamp voltage (a value exceeding the lamp voltage upon a normal arc discharge).

As described above, the lighting method for a high-pressure discharge lamp and other techniques according to the present invention serve to lessen the impact of attack to the root of each electrode upon an abnormal discharge, and thus to suppress blackening of the discharge tube.

Modifications

Up to this point, the present invention has been described by way of the embodiment. However, it is naturally appreciated that the present invention is not limited to the specific embodiment described above, and various modifications may be made as follows.

That is, in the above embodiment, the control circuit 502 is described to be implemented by a microcomputer. Yet, widely used in place of a microcomputer is a lighting control circuit composed of various circuits in combination (hereinafter, referred to as "an analog lighting circuit"). Such an analog lighting circuit is disclosed, for example, in JP publication of unexamined patent application No. 5-67496 or No. 5-144577.

The present invention is applicable to an analog lighting circuit as above. To this end, an analog lighting circuit is required to include, for example, a circuit for detecting that the lamp voltage reaches a predetermined threshold within a predetermined time period, or a circuit for detecting that the lamp voltage exceeds the predetermined threshold for longer than a predetermined time period. The time measurement function may be realized by adjusting the time constant of a time constant circuit or by using a counter. The detection of the lamp voltage exceeding a predetermined threshold is carried out by, for example, a comparator circuit comparing the lamp voltage with the threshold.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A lighting method for a high-pressure discharge lamp that is composed of a discharge tube, the discharge tube being filled with mercury, a rare gas and a halogen material, and having a pair of electrodes provided therein, the lighting method comprising:

a discharge shift detecting step of detecting that a discharge across the pair of electrodes has shifted to an arc discharge after a discharge starts and before the mercury fully evaporates;

a voltage rise detecting step of detecting that a lamp voltage has risen to exceed a predetermined level after a shift to an arc discharge is detected and before the mercury fully evaporates; and a current reducing step of reducing a lamp current when the lamp voltage is detected in the voltage rise detecting step to exceed the predetermined level.

2. The lighting method according to claim 1, wherein the lamp current is cut off in the lamp current reducing step.

3. The lighting method according to claim 2, further comprising a re-lighting step of re-lighting the lamp after the lamp current cutoff.

4. The lighting method according to claim 3, wherein the re-lighting step is performed within two seconds from the lamp current cutoff.

5. The lighting method according to claim 1, wherein the discharge shift detecting step detects a shift to an arc discharge occurring within a five-second period from a most-recently produced dielectric breakdown between the pair of electrodes, and the voltage rise detecting step detects a voltage rise occurring within the five-second period and after the shift is detected in the discharge shift detecting step.

6. A lighting method for a high-pressure discharge lamp that is composed of a discharge tube, the discharge tube being filled with mercury, a rare gas and a halogen material, and having a pair of electrodes provided therein, the lighting method comprising:

a time-measuring step of measuring a lapse of a first predetermined time period in a transition state, the transition state beginning at a discharge start and ending at full evaporation of the mercury;

a voltage rise detecting step of detecting, during the first predetermined time period, that a lamp voltage has risen to exceed a predetermined level after a lapse of a second predetermined time period that is shorter than the first predetermined time period, the predetermined level being higher than a lamp voltage belonging to an arc discharge phase; and a current reducing step of reducing a lamp current when the lamp voltage is detected in the voltage rise detecting step to exceed the predetermined level.

7. The lighting method according to claim 6, wherein the lamp current is cut off in the lamp current reducing step.

8. The lighting method according to claim 7, further comprising a re-lighting step of re-lighting the lamp after the lamp current cutoff.

9. The lighting method according to claim 8, wherein the re-lighting step is performed within two seconds from the lamp current cutoff.

10. The lighting method according to claim 6, wherein the second predetermined time period is a duration of two milliseconds from a most-recently produced dielectric breakdown between the pair of electrodes.

11. The lighting method according to claim 6, wherein the first predetermined time period is a duration of five seconds from a most-recently produced dielectric breakdown between the pair of electrodes.

12. A lighting apparatus for a high-pressure discharge lamp that is composed of a discharge tube, the discharge tube being filled with mercury, a rare gas and a halogen material, and having a pair of electrodes provided therein, the lighting apparatus comprising:

a lamp voltage detector for detecting a lamp voltage, the lamp voltage being a voltage present across the pair of electrodes;

a lamp current detector for detecting a current flowing across the pair of electrodes; and a control circuit for reducing the lamp current when the lamp voltage detector detects that the lamp voltage has risen to exceed a threshold after a shift to an arc discharge is detected and before a predetermined time period is elapsed, the predetermined time period being determined based on a transition state that begins at a discharge start and ends at full evaporation of the mercury, and the threshold being higher than a lamp voltage belonging to an arc discharge phase.

13. The lighting apparatus according to claim 12, wherein the control circuit cuts off the lamp current.

14. The lighting apparatus according to claim 13, wherein the control circuit re-lights the lamp after the lamp current cutoff.

15. The lighting apparatus according to claim 14, wherein the control circuit re-lights the lamp within two seconds from the lamp current cutoff.

16. The lighting apparatus according to claim 12, wherein the predetermined time period is a duration of five seconds from a most-recently produced dielectric breakdown between the pair of electrodes.

17. A lighting apparatus for a high-pressure discharge lamp that is composed of a discharge tube, the discharge tube being filled with mercury, a rare gas and a halogen material, and having a pair of electrodes provided therein, the lighting apparatus comprising:
   a lamp voltage detector for detecting a lamp voltage, the lamp voltage being a voltage present across the pair of electrodes;
   a lamp current detector for detecting a current flowing across the pair of electrodes; and
   a control circuit for reducing the lamp current when the lamp voltage detector detects that the lamp voltage has risen to exceed a threshold after a lapse of a second predetermined time period and during a first predetermined time period, the second predetermined time period being shorter than the first predetermined time period, the first predetermined time period being determined based on a transition state that continues until the mercury completely evaporates, and the threshold being higher than a lamp voltage belonging to an arc discharge phase.

18. The lighting apparatus according to claim 17, wherein the control circuit cuts off the lamp current.

19. The lighting apparatus according to claim 18, wherein the control circuit re-lights the lamp after the lamp current cutoff.

20. The lighting apparatus according to claim 19, wherein the control circuit re-lights the lamp within two seconds from the lamp current cutoff.

21. The lighting apparatus according to claim 17, wherein the second predetermined time period is a duration of two milliseconds from a most-recently produced dielectric breakdown between the pair of electrodes.

22. The lighting apparatus according to claim 17, wherein the first predetermined time period is a duration of five seconds from a most-recently produced dielectric breakdown between the pair of electrodes.

23. A high-pressure discharge lamp apparatus comprising:
   a socket for detachable attachment of a high-pressure lamp thereto; and
   a lighting circuit for lighting a high-pressure discharge lamp being attached to the socket, the high-pressure discharge lamp being composed of a discharge tube that is filled with mercury and a halogen material, and that is provided with a pair of electrodes,
   wherein the lighting circuit includes:
      a lamp voltage detector for detecting a lamp voltage, the lamp voltage being a voltage present across the pair of electrodes;
      a lamp current detector for detecting a current flowing across the pair of electrodes; and
      a control circuit for reducing the lamp current when the lamp voltage detector detects that the lamp voltage has risen to exceed a threshold after a lapse of a second predetermined time period and during a first predetermined time period, the second predetermined time period being shorter than the first predetermined time period, the first predetermined time period being determined based on a transition state that continues until the mercury completely evaporates, and the threshold being higher than a lamp voltage belonging to an arc discharge phase.

24. A high-pressure discharge lamp apparatus comprising:
   a socket for detachable attachment of a high-pressure lamp thereto; and
   a lighting circuit for lighting a high-pressure discharge lamp being attached to the socket, the high-pressure discharge lamp being composed of a discharge tube that is filled with mercury and a halogen material, and that is provided with a pair of electrodes,
   wherein the lighting circuit includes:
      a lamp voltage detector for detecting a lamp voltage, the lamp voltage being a voltage present across the pair of electrodes;
      a lamp current detector for detecting a current flowing across the pair of electrodes; and
      a control circuit for reducing the lamp current when the lamp voltage detector detects that the lamp voltage has risen to exceed a threshold after a shift to an arc discharge is detected and before a predetermined time period is elapsed, the predetermined time period being determined based on a transition state that begins at a discharge start and ends at full evaporation of the mercury, and the threshold being higher than a lamp voltage belonging to an arc discharge phase.

25. A high-pressure discharge lamp apparatus comprising:
   a high-pressure discharge lamp composed of a discharge tube, the discharge tube being filled with mercury and a halogen material, and having a pair of electrodes provided therein;
   a lighting circuit for lighting the lamp,
   wherein the lighting circuit includes:
      a lamp voltage detector for detecting a lamp voltage, the lamp voltage being a voltage present across the pair of electrodes;
      a lamp current detector for detecting a current flowing across the pair of electrodes; and
      a control circuit for reducing the lamp current when the lamp voltage detector detects that the lamp voltage has risen to exceed a threshold after a shift to an arc discharge is detected and before a predetermined time period is elapsed, the predetermined time period being determined based on a transition state that begins at a discharge start and ends at full evaporation of the mercury, and the threshold being higher than a lamp voltage belonging to an arc discharge phase.

26. A high-pressure discharge lamp apparatus comprising:
   a high-pressure discharge lamp composed of a discharge tube, the discharge tube being filled with mercury and a halogen material, and having a pair of electrodes provided therein;

a lighting circuit for lighting the lamp, wherein the lighting circuit includes:

a lamp voltage detector for detecting a lamp voltage, the lamp voltage being a voltage present across the pair of electrodes;

a lamp current detector for detecting a current flowing across the pair of electrodes; and a control circuit for reducing the lamp current when the lamp voltage detector detects that the lamp voltage has risen to exceed a threshold after a lapse of a second predetermined time period and during a first predetermined time period, the second predetermined time period being shorter than the first predetermined time period, the first predetermined time period being determined based on a transition state that continues until the mercury completely evaporates, and the threshold being higher than a lamp voltage belonging to an arc discharge phase.

* * * * *